(12) United States Patent
Sugahara et al.

(10) Patent No.: US 10,062,004 B2
(45) Date of Patent: Aug. 28, 2018

(54) ARRANGEMENT DETECTION APPARATUS AND PICKUP APPARATUS

(71) Applicant: KABUSHIKI KAISHA TOSHIBA, Minato-ku (JP)

(72) Inventors: Atsushi Sugahara, Kawasaki (JP); Haruna Eto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 40 days.

(21) Appl. No.: 15/239,964

(22) Filed: Aug. 18, 2016

(65) Prior Publication Data
US 2017/0053410 A1 Feb. 23, 2017

(30) Foreign Application Priority Data
Aug. 20, 2015 (JP) .................................. 2015-162904

(51) Int. Cl.
*G06K 9/46* (2006.01)
*G06K 9/62* (2006.01)
*G06T 7/73* (2017.01)

(52) U.S. Cl.
CPC ......... *G06K 9/6202* (2013.01); *G06K 9/4604* (2013.01); *G06T 7/75* (2017.01); *G06T 2207/30128* (2013.01)

(58) Field of Classification Search
None
See application file for complete search history.

(56) References Cited

U.S. PATENT DOCUMENTS

| 5,819,016 | A | * | 10/1998 | Watanabe | ............ | G01B 11/002 |
| | | | | | | 345/419 |
| 6,055,462 | A | | 4/2000 | Sato | | |
| 6,542,638 | B2 | * | 4/2003 | Campbell | ............ | G06K 9/6211 |
| | | | | | | 382/201 |
| 7,538,764 | B2 | * | 5/2009 | Salomie | .................. | G06T 17/20 |
| | | | | | | 345/418 |

(Continued)

FOREIGN PATENT DOCUMENTS

| JP | 11-116056 A | 4/1999 |
| JP | 2004-171330 A | 6/2004 |

(Continued)

OTHER PUBLICATIONS

Jukka Jylanki, "A Thousand Ways to Pack the Bin—A Practical Approach to Two-Dimensional Rectangle Bin Packing," Feb. 27, 2010, http://clb.damon.fi/files/RectangleBinPack.pdf, 50 pages.

*Primary Examiner* — Feng Niu

(74) *Attorney, Agent, or Firm* — Oblon, McClelland, Maier & Neustadt, L.L.P.

(57) ABSTRACT

According to an embodiment, an arrangement detection apparatus includes a measuring unit, an extractor, a generator, a first calculator. The measuring unit measures surfaces of polyhedrons, the polyhedrons being identical in shape and arranged in contact with each other. The extractor extracts a surface region from the surfaces, the surface region having a maximal area and being closest to the measuring unit. The generator generates outlines of at least one of desired surfaces of the polyhedrons included in the surface region. The first calculator calculates position information on the polyhedrons included in the surface region, utilizing the outlines.

13 Claims, 12 Drawing Sheets

(56) References Cited

U.S. PATENT DOCUMENTS

| | | | |
|---|---|---|---|
| 7,801,328 B2* | 9/2010 | Au | G06K 9/00771 345/156 |
| 8,718,382 B2 | 5/2014 | Fang et al. | |
| 8,805,570 B2* | 8/2014 | Kawauchi | B23Q 17/20 345/418 |
| 9,486,921 B1* | 11/2016 | Straszheim | B25J 9/1679 |
| 9,649,767 B2* | 5/2017 | Nusser | B25J 9/1679 |
| 2005/0033731 A1 | 2/2005 | Lesh et al. | |
| 2006/0227997 A1* | 10/2006 | Au | G06K 9/00771 382/103 |
| 2006/0290695 A1* | 12/2006 | Salomie | G06T 17/20 345/420 |
| 2010/0004778 A1* | 1/2010 | Arimatsu | B25J 9/1697 700/214 |
| 2012/0089247 A1* | 4/2012 | Kawauchi | B23Q 17/20 700/178 |
| 2013/0238125 A1* | 9/2013 | Suzuki | B25J 9/1612 700/253 |
| 2015/0203304 A1* | 7/2015 | Morency | B65G 59/02 414/797 |
| 2015/0344225 A1 | 12/2015 | Nakamura et al. | |
| 2016/0096643 A1* | 4/2016 | Baylor | B25J 15/0616 53/443 |
| 2016/0207195 A1 | 7/2016 | Eto et al. | |
| 2017/0021502 A1* | 1/2017 | Nusser | B25J 9/1679 |

FOREIGN PATENT DOCUMENTS

| | | |
|---|---|---|
| JP | 2005-56421 A | 3/2005 |
| JP | 2007-142766 A | 6/2007 |
| JP | 2010-219686 A | 9/2010 |
| JP | 2012-137841 A | 7/2012 |
| JP | 2015-224125 A | 12/2015 |
| JP | 2016-132521 A | 7/2016 |

* cited by examiner

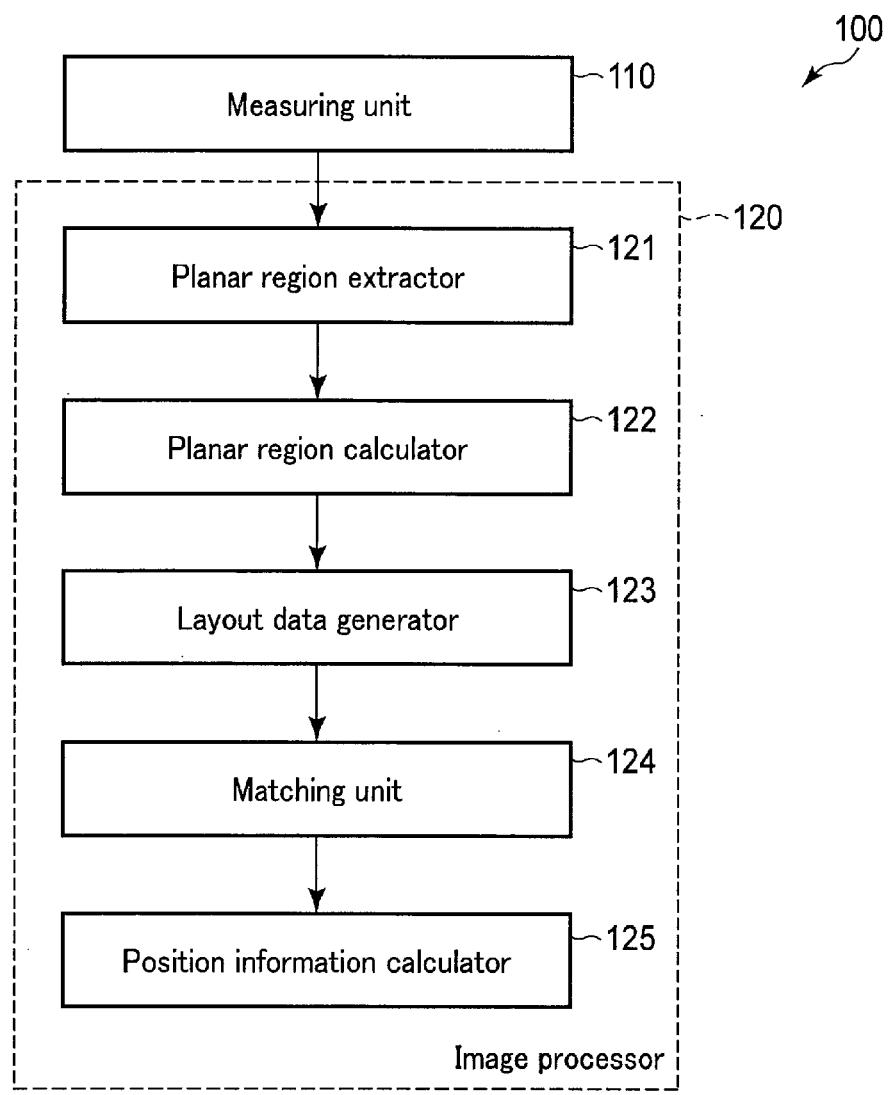
F I G. 1

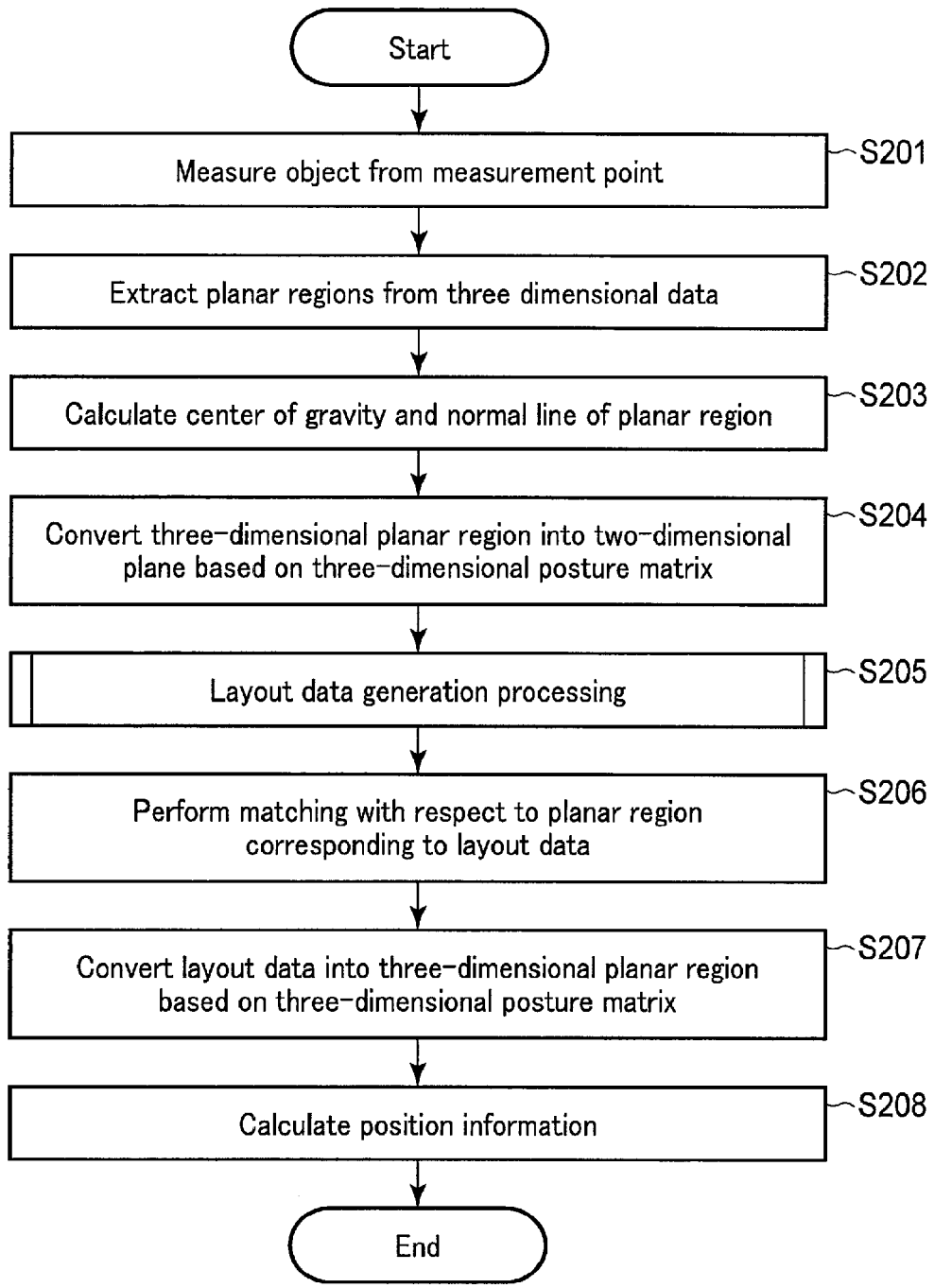
F I G. 2A

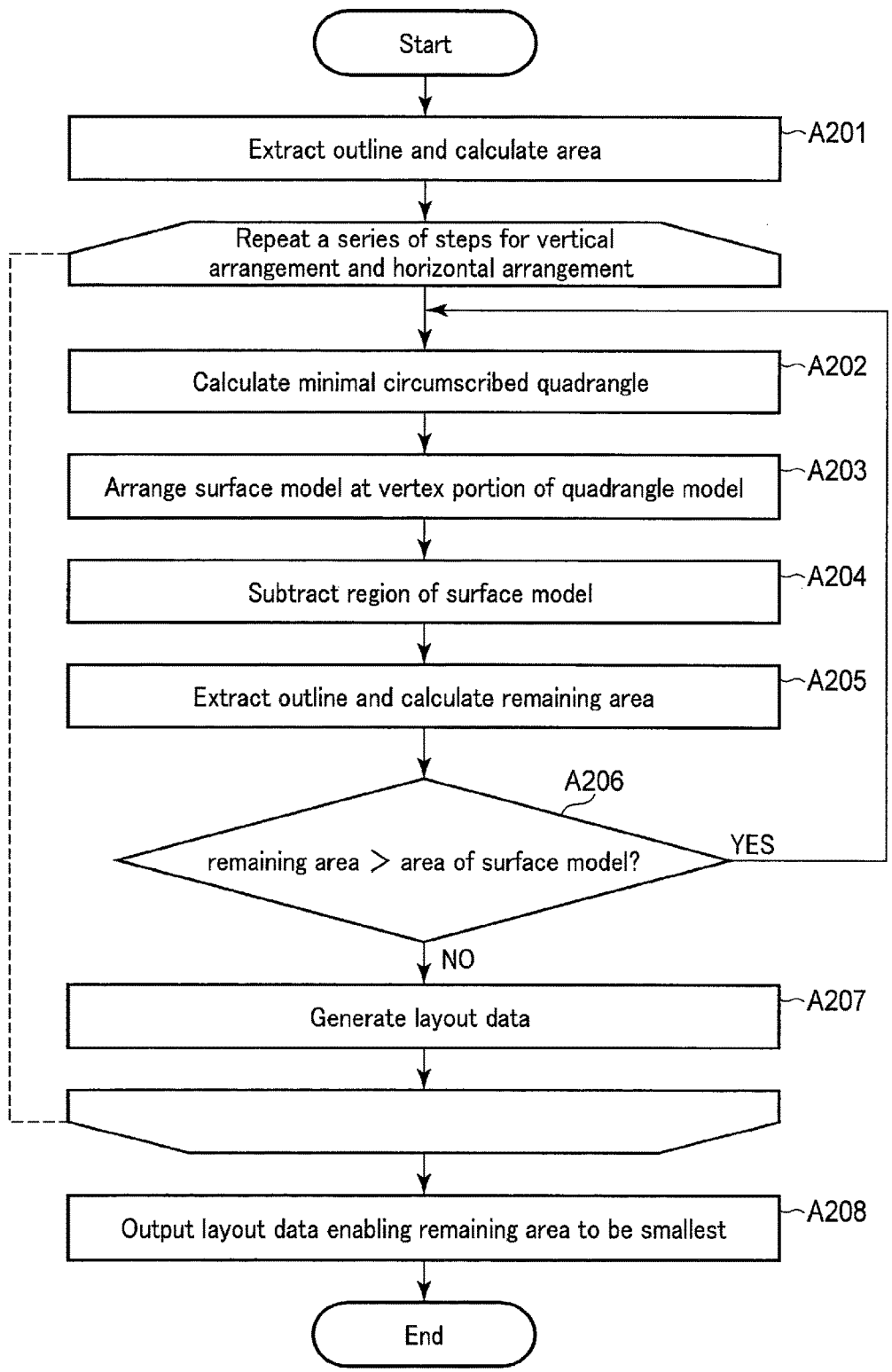
F I G. 2B

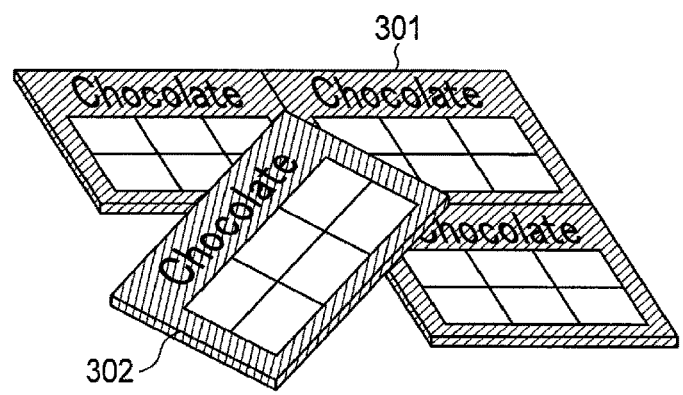
F I G. 3
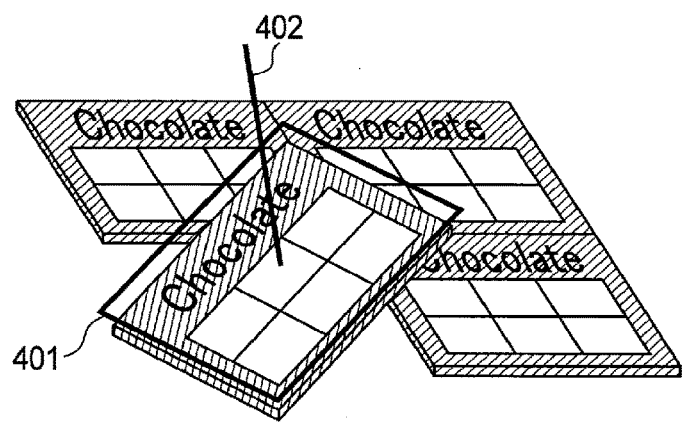
F I G. 4
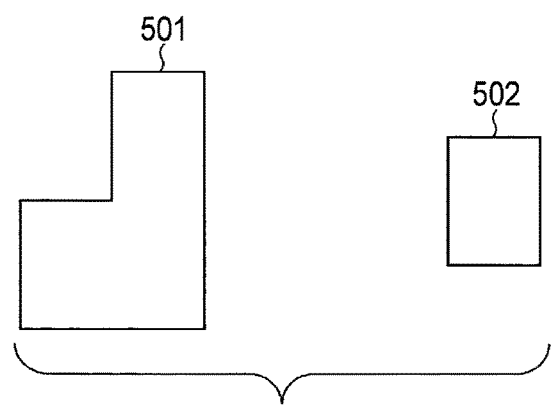
F I G. 5

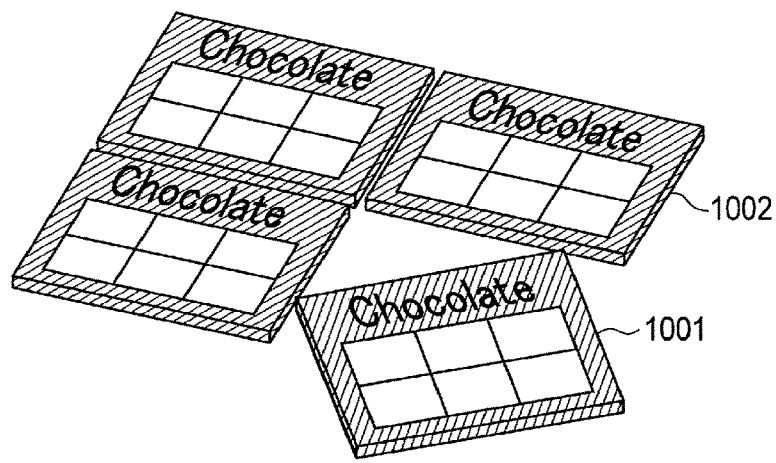
F I G. 10
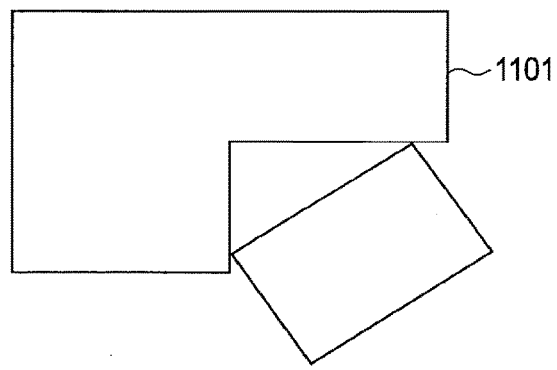
F I G. 11A
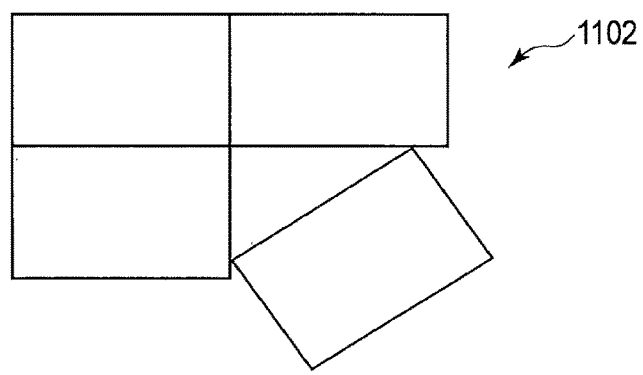
F I G. 11B

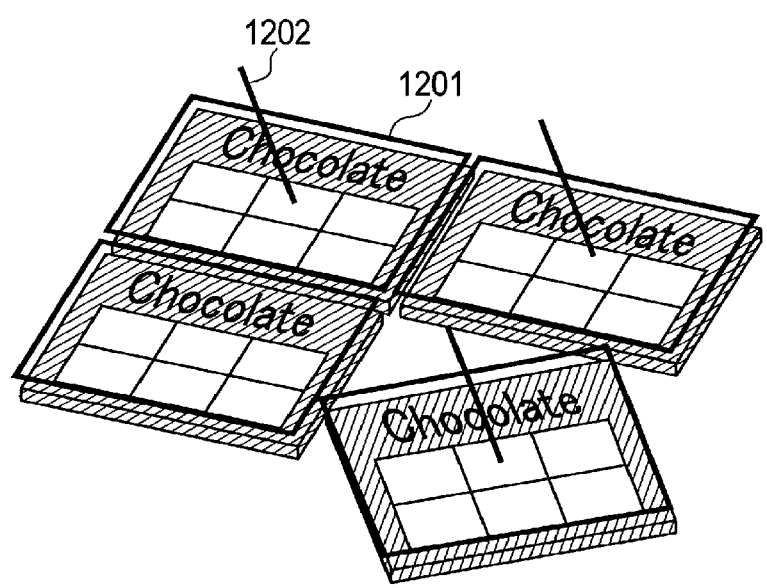
F I G. 12

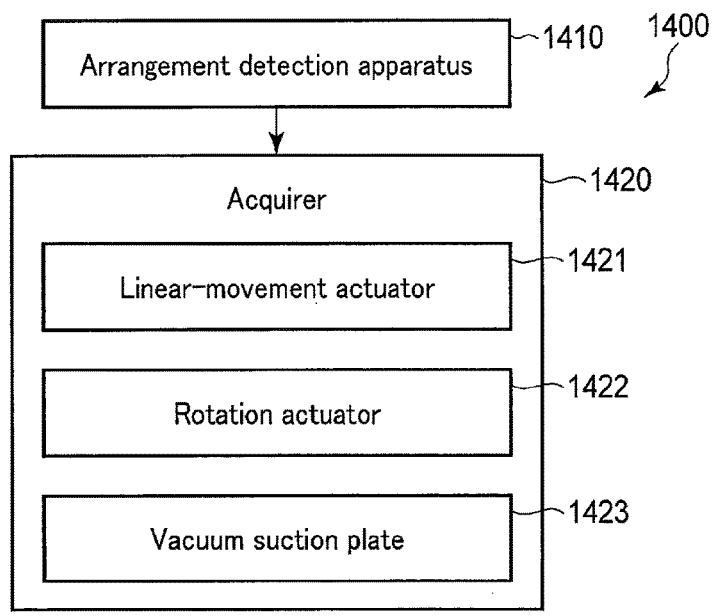
F I G. 14
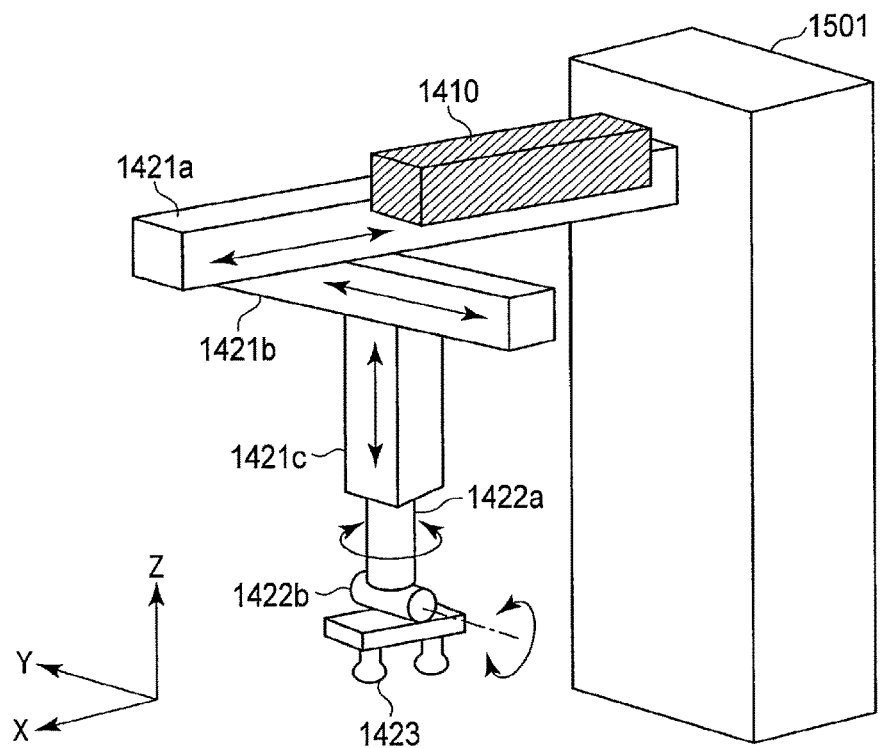
F I G. 15

ARRANGEMENT DETECTION APPARATUS AND PICKUP APPARATUS

CROSS-REFERENCE TO RELATED APPLICATION

This application is based upon and claims the benefit of priority from Japanese Patent Application No. 2015-162904, filed Aug. 20, 2015, the entire contents of which are incorporated herein by reference.

FIELD

The embodiments described herein relate to an arrangement detection apparatus and a pickup apparatus.

BACKGROUND

Even now, sorting product packages, boxing of them, putting them on shelves and taking them out of the shelves are performed manually in many cases. It is desired that these operations be automatically performed by machines. However, the product packages are not necessarily arranged in order on product shelves or in cardboard boxes. Some of the product packages may be stacked neatly, and some may not. In this state, each package product cannot be easily identified though this identification is required for automation.

An arrangement detection apparatus uses matching technology for two dimensional images, which utilizes difference information between a template image of an object and an acquired image. However, this arrangement detection apparatus does not use depth information and does not ensure accurate detection of individual objects. If objects of the same shape are arranged with no gap between them, no method is available to detect how each object is arranged.

BRIEF DESCRIPTION OF THE DRAWINGS

FIG. 1 is a block diagram illustrating an arrangement detection apparatus according to the first embodiment.

FIG. 2A is a flowchart illustrating an example of an operation of the arrangement detection apparatus depicted in FIG. 1.

FIG. 2B is a flowchart illustrating an example of layout data generation processing depicted in FIG. 2A.

FIG. 3 illustrates product packages arranged in disorder.

FIG. 4 illustrates an outline and a normal line of a detected product package.

FIG. 5 illustrates examples of a plane model and a surface model.

FIG. 10 illustrates product packages which are arranged, with one of them oblique.

FIG. 11A illustrates an example of an extraction result of the plane region shown in FIG. 10.

FIG. 11B illustrates an example of layout data depicted in FIG. 11A.

FIG. 12 illustrates outlines and normal lines of detected product packages.

FIG. 14 is a block diagram of a pickup apparatus according to the second embodiment.

FIG. 15 illustrates an example of a structure of the pickup apparatus depicted in FIG. 14.

DETAILED DESCRIPTION

Figure 6A:
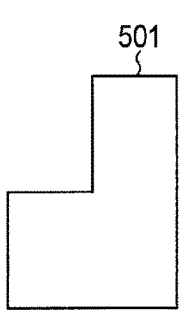
FIGS. 6A-6E illustrate an example of a method in which surface models are laid on the plane model.

A description will now be given of the embodiments with reference to the accompanying drawings.

According to an embodiment, an arrangement detection apparatus includes a measuring unit, an extractor, a generator, a first calculator. The measuring unit measures surfaces of polyhedrons, the polyhedrons being identical in shape and arranged in contact with each other. The extractor extracts a surface region from the surfaces, the surface region having a maximal area and being closest to the measuring unit. The generator generates outlines of at least one of desired surfaces of the polyhedrons included in the surface region. The first calculator calculates position information on the polyhedrons included in the surface region, utilizing the outlines.

In the descriptions below, the same respective reference numbers will be used to denote elements similar or corresponding to described elements, and redundant explanations will be omitted where appropriate.

In the descriptions below, a "rectangular parallelepiped" will be mentioned as an example of a "polyhedron," but this is not restrictive. Objects having other shapes may be used. The "rectangular parallelepiped" and "product package" are interchangeable.

(First Embodiment)

As shown in FIG. 1, the arrangement detection apparatus 100 of the first embodiment comprises a measuring unit 110 and an image processor 120. The image processor 120 includes a planar region extractor 121, a planar region calculator 122, a layout data generator 123, a matching unit 124, and a position information calculator 125. The measuring unit 110 is for example, a combination of a three-dimensional distance image sensor and an RGB image sensor. The image processor 120 is, for example, a computer.

The measuring unit 110 measuring the surfaces of rectangular parallelepipeds (polyhedrons), which are of the same shape and arranged in contact with each other, from a measurement point (a first any point) and obtains a set of coordinates at any points on the rectangular parallelepipeds as three dimensional data (second data). The measurement point is a position where the measuring unit 110 is provided. The three dimensional data is, for example, point data on a set of points in three dimensional coordinates. The measuring unit 110 outputs the three dimensional data to the planar region extractor 121.

The planar region extractor 121 receives the three dimensional data from the measuring unit 110. The planar region extractor 121 extracts data on the surfaces of the rectangular parallelepipeds measured by the measuring unit 110, and extracts a surface region containing a portion closest to the measurement point and having a maximal area. To be more specific, the planar region extractor 121 extracts one or more planar regions from the three dimensional data as planar region candidates. In addition, the planar region extractor 121 extracts a planar region containing a portion closest to the measurement point and having a maximal area from the extracted planar region candidates. The planar region is, for example, point data on a set of points in three dimensional coordinates. The planar region extractor 121 outputs data on the planar region to the planar region calculator 122 and layout data generator 123. Where two or more planar regions are obtained, the planar region extractor 121 selects either one of the planar regions.

The planar region calculator 122 (a second calculator) receives data on a planar region from the planar region extractor 121. The planar region calculator 122 calculates a center of gravity and a normal line of the planar region. The planar region calculator 122 outputs data on the center of gravity and normal line of the planar region to the layout data generator 123.

The layout data generator 123 receives planar region data, which is outputted thereto from the planar region extractor 121 by way of the planar region calculator 122. Also, the layout data generator 123 receives data on the center of gravity and the normal line from the planar region calculator 122. The layout data generator 123 generates layout data (first data) representing the outlines which are included in a planar region viewed from a point on the normal line extending from the center of gravity and which are those of a desired surface of at least one rectangular parallelepiped. The "rectangular parallelepiped" mentioned herein is intended to mean a "rectangular parallelepiped which has the same shape as the rectangular parallelepiped constituting an object measured by the measuring unit 110," and this definition is applicable to the "rectangular parallelepiped" mentioned below. The layout data generator 123 stores data on the shapes of rectangular parallelepipeds. The layout data generator 123 outputs layout data to the matching unit 124.

To be specific, the layout data generator 123 generates layout data representing the outlines of desired surfaces of rectangular parallelepipeds. The layout data are obtained when surface models (which represent the outlines of desired surfaces of the rectangular parallelepipeds) are laid on the plane model representing the outline of the planar region and when the area of the plane model not overlaid with the surface models is minimal. To be more specific, the layout data generator 123 generates layout data by placing a surface model on the plane model, with their vertex angles in conformity with each other, and subtracting the region of the surface model from the region of the plane model if the placed surface model is entirely included in the plane model.

The matching unit 124 receives layout data from the layout data generator 123. The matching unit 124 performs template matching for a planar region corresponding to the layout data, using a template representing a design on a desired surface of a rectangular parallelepiped. Alternatively, the matching unit 124 may perform template matching for the planar region corresponding to the layout data, using a local image feature which is extracted, with part of the design on the desired surface of the rectangular parallelepiped being processed as a vector. The matching method is not limited to these examples, and various other techniques may be used. When matching is detected between the planar region corresponding to the layout data and the template or the local image feature, the matching unit 124 outputs the layout data to the position information calculator 125. A specific example of matching will be described later.

The position information calculator 125 (a first calculator) receives the layout data from the matching unit 124. The position information calculator 125 calculates position information on the rectangular parallelepipeds included in the planar region, utilizing the positions of the outlines of the desired surfaces of the rectangular parallelepipeds, i.e., the positions represented by the layout data. The position information includes, for example, information on the center of gravity of each rectangular parallelepiped, information on the vertexes of each rectangular parallelepiped, information on the posture angle of each rectangular parallelepiped, etc.

The arrangement detection apparatus 100 performs such an operation as illustrated in FIG. 2. The arrangement detection apparatus 100 can detect arrangement of product packages even if these product packages are arranged in disorder, as shown in FIG. 3. In FIG. 3, one product package 302 is laid over its adjacent three product packages 301. The arrangement detection apparatus 100 first detects product package 302 based on the distance information from the measurement point, and outputs position information based on the outlines 401 and normal line 402 shown in FIG. 4.

In step S201, the measuring unit 110 measures the surfaces of objects (i.e., rectangular parallelepipeds which are of the same shape and arranged in contact with each other) and obtains a set of coordinates at any points on the objects as three dimensional data. To be specific, the measuring unit 110 acquires point data on a set of points, using the depth data detected by the three-dimensional distance image sensor, and adds color information detected by the RGB image sensor to the point data, thereby obtaining three dimensional data on the objects. The three dimensional data may be made of the point data without color information.

In step S202, the planar region extractor 121 extracts a plurality of planar regions from the three dimensional data as planar region candidates. In addition, the planar region extractor 121 extracts a planar region containing a portion closest to the measurement point and having a maximal area from the extracted planar region candidates. When narrowing down the extracted planar region candidates, the planar region extractor 121 may use a filter for limiting the three dimensional data. To shorten the calculation time, the planar region extractor 121 may use a filter that makes the density of point data coarse. Where two or more planar regions are obtained, the planar region extractor 121 selects one of the planar regions.

In step S203, the planar region calculator 122 calculates a center of gravity and a normal line of the planar region. To be specific, the planar region calculator 122 performs principal component analysis for the point data distributed in the planar region to obtain main axes, and obtains a center of gravity based on the main axes. The center of gravity is the point at which the major axis of the main axes (a first component) and the minor axis (a second component) thereof intersect with each other. In addition, the planar region calculator 122 calculates a three-dimensional posture matrix, using the main axes and a normal line (a normal vector) obtained based on the main axes. The three-dimensional posture matrix is a matrix of (3 rows×3 columns) and includes a base vector of the major axis (3 rows×1 column), a base vector of the minor axis (3 rows×1 column), and a base vector of the normal line (3 rows×1 column).

In step S204, the planar region calculator 122 converts the three-dimensional planar region into a two-dimensional plane based on the three-dimensional posture matrix. Layout data generation processing (step S205) is performed after step S204.

The details of the layout generation processing (step S205) are illustrated in FIG. 2B. The layout generation processing can generate layout data by laying surface models 502 (each representing the outline of the desired surface of a product package) on the plane model 501 (which represents the outline of a planar region such as that shown in FIG. 5) (the plane model 501 shown in FIG. 5 corresponds to the three adjacent product packages 301 shown in FIG. 3).

The shape of the product package (such as surface model 502) is retained as data in the layout data generator 123.

At the start of the layout data generation processing, the layout data generator 123 extracts the outline of a planar region as a plane model and calculates an area of the planar region (step A201). For example, the layout data generator 123 may calculate the area by creating a plane by drawing circles for the respective point data distributed in a two-dimensional planar region.

The layout data generator 123 executes a series of steps A202 to A207 for vertical arrangement in which surface models are arranged in a portrait style and horizontal arrangement in which surface models are arranged in a landscape style. In the vertical arrangement, the longer sides of surface models are arranged along the longer side of the plane model. In the horizontal arrangement, the shorter sides of the surface models are arranged along the longer side of the plane model. The layout data generator 123 may generate layout data on the horizontal arrangement after generating layout data on the vertical arrangement. Conversely, the layout data generator 123 may generate layout data on the vertical arrangement after generating layout data on the horizontal arrangement.

In step A202, the layout data generator 123 calculates a minimal circumscribed quadrangle of the plane model. Then, the layout data generator 123 extracts a quadrangle model representing the outline of the minimal circumscribed quadrangle.

In step A203, the layout data generator 123 arranges a surface model at a vertex portion of the quadrangle model. To be specific, the layout data generator 123 places a vertex of the surface model in accordance with the angle of a vertex of the quadrangle model. If it is apparent that the region of the surface model is not included in the region of the plane model, the surface model does not have to be applied to the quadrangle model.

In step A204, the layout data generator 123 subtracts the region of the surface model from the region of the plane model if the placed surface model is entirely included in the plane model. Then, the layout data generator 123 stores data on the center of gravity and vertex coordinates of the surface model in a memory (not shown). If the region of the placed surface model is entirely included in the region containing two vertexes sharing a side of the plane model, the layout data generator 123 may arrange another surface model in the region containing the side and subtract the region of the surface model from the region containing the side (a specific description will be given later).

In step A205, the layout data generator 123 extracts an outline of the region of the plane model from which the region of the surface model is subtracted, and calculates an area (remaining area) of the region defined by the outline.

In step A206, the layout data generator 123 determines whether the remaining area is larger than the area of a surface model. If the remaining area is larger than the area of the surface model, the layout data generator 123 determines that the outline extracted in step A205 represents a plane model, and the flow returns to step A202. If the remaining area is not, the flow advances to step A207.

In step A207, the layout data generator 123 generates layout data representing the outline of at least one surface model included in a plane model.

In step A208, the layout data generator 123 selects which layout data, the layout data on the vertical arrangement or the layout data on the horizontal arrangement, enables the remaining data to be smaller, and outputs the selected layout data. If the remaining area of the layout data on the vertical arrangement is equal to the remaining data of the layout data on the horizontal arrangement, the layout data generator 123 may output both the layout data on the vertical arrangement and the layout data on the horizontal arrangement. After step A208, the processing advances to step S206 shown in FIG. 2A.

In step S206, the matching unit 124 performs matching with respect to the planar region corresponding to the layout data. To be specific, the matching unit 124 performs template matching for a planar region corresponding to the layout data, using a template representing a design on a desired surface. Alternatively, the matching unit 124 performs local image feature matching for the planar region corresponding to the layout data, using a local image feature which is extracted, with part of the design on a desired surface being processed as a vector.

In step S207, the position information calculator 125 converts the layout data into three-dimensional planar region based on the three-dimensional posture matrix.

In step S208, the position information calculator 125 calculates position information on the rectangular parallelepipeds included in the planar region, utilizing the positions of the outlines of the desired surfaces of the rectangular parallelepipeds, i.e., the positions represented by the layout data.

FIGS. 6A-6E illustrate a specific example of the layout data generation processing shown in FIG. 2B. In the following, a specific example of the layout data generation processing will be described, referring to the flowchart of FIG. 2B and using the plane model 501 and surface model 502 shown in FIG. 5.

Figure 6B:
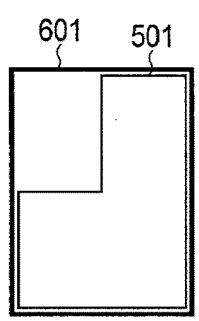

The layout data generator 123 extracts an outline of a planar region (plane model 501) (step A201, FIG. 6A), calculates a minimal circumscribed quadrangle of the plane model 501, and extracts a quadrangle model 601 representing the outline of the minimal circumscribed quadrangle (step A202, FIG. 6B).

Figure 6C:
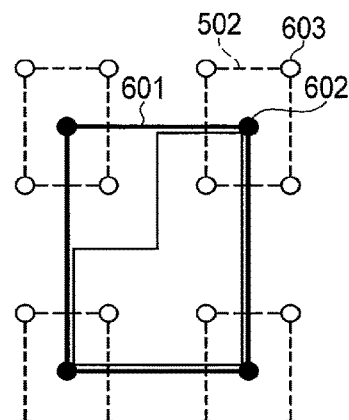
Figure 6D:
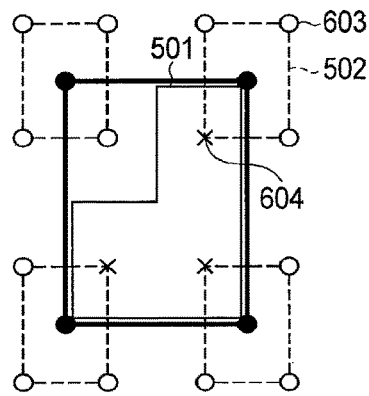
Figure 6E:
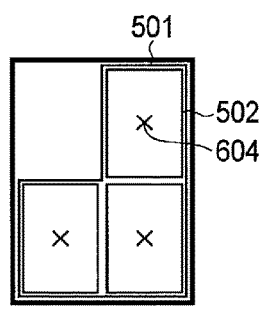

Subsequently, the layout data generator 123 arranges a surface model 502 at a vertex portion of the quadrangle model 601 (step A203). To be specific, the layout data generator 123 determines vertexes 603 of a surface model 502, with a vertex 602 of the quadrangle model 601 as a center, as shown in FIG. 6C. In FIG. 6D, the layout data generator 123 extracts a vertex located inside the plane model 501 from the vertexes 603 of the surface model 502. In FIG. 6E, the layout data generator 123 arranges the surface model 502 in the plane model 501, with the extracted vertex 604 as a center. If another extracted vertex is located near the extracted vertex, the layout data generator 123 may merge the vertexes.

The layout data generator 123 subtracts the region of the surface model 502 from the region of the plane model 501 since the region of the surface model 502 is entirely included in the region of the plane model 501 (step A204). Then, the layout data generator 123 stores data on the center of gravity and vertex coordinates of the surface model 502 in a memory (not shown).

The layout data generator 123 calculates an area (a remaining area) of the region defined by the outline of the plane model 501 from which the region of the surface model 502 is subtracted (step A205). The layout data generator 123 determines that the remaining area is not larger than the area of the surface model 502 (step A206) and generates layout data representing how surface models 502 are arranged in the plane model 501 (step A207).

Figure 7A:
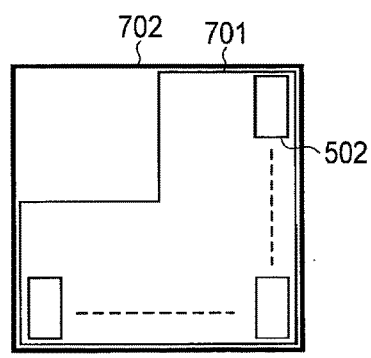
FIGS. 7A-7C illustrate an example of a method in which surface models are laid on the plane model.
Figure 7B:
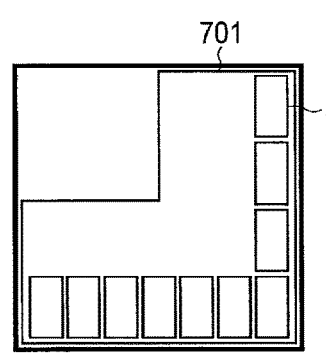
Figure 7C:
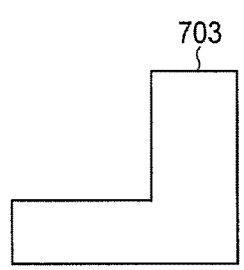

FIGS. 7A-7C illustrate an example of the layout data generation processing performed when the plane model 502 is sufficiently larger than the surface model 502. The layout data generator 123 arranges a surface model 502 at each vertex portion of a quadrangle model 702, representing the outline of the minimal circumscribed quadrangle of the plane model 701 (FIG. 7A). Since the region of the arranged surface model 502 is entirely included in the region containing two vertexes sharing a side of the plane model 701, the layout data generator 123 arranges another surface model 502 in the region containing the side (FIG. 7B). Further, the layout data generator 123 subtracts the region of the surface model 502 from the region containing the side, thereby obtaining a new plane model 703 (FIG. 7C).

Figures 8A, 8B:
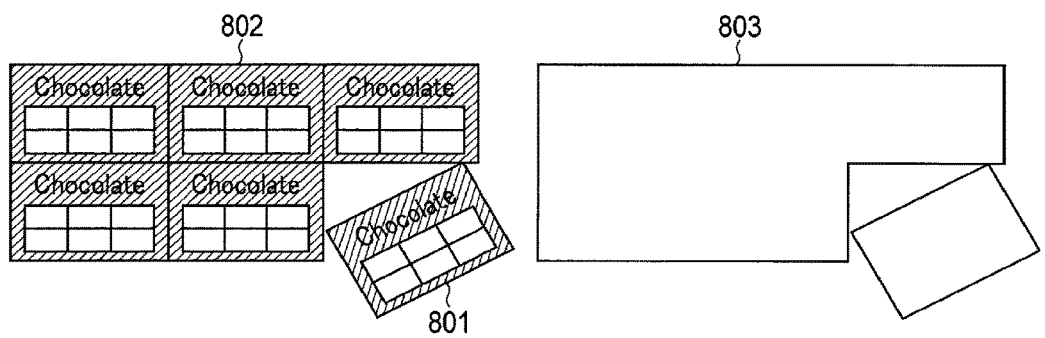
FIGS. 8A-8C illustrate a specific example of matching.
Figure 8C:
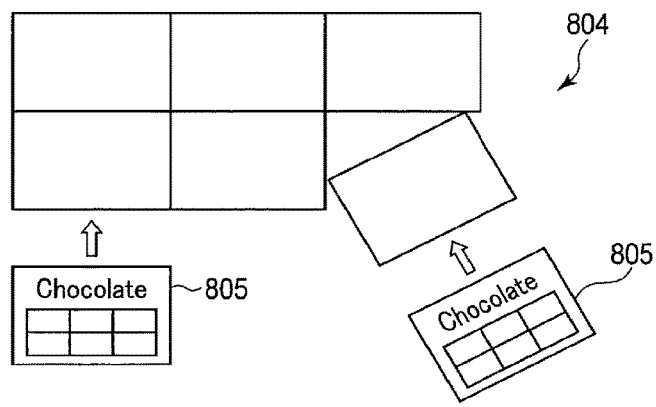

FIGS. 8A-8C illustrate a specific example of matching. In the example illustrated in FIG. 8A, the lower right product package 801 is arranged in the rotated state with respect to the other product packages 802. FIG. 8B shows a plane model 803 obtained from the product packages shown in FIG. 8A. FIG. 8C shows layout data 804 corresponding to the plane model 803. The matching unit 124 performs template matching for a planar region (FIG. 8A) corresponding to the layout data 804, using a template 805 representing the design of the product packages.

For example, if normal template matching is performed for the planar region shown in FIG. 8A without using layout data, the template has to be slightly moved from side to side or rotated in a number of different ways, each time a scan is executed. As a result, the processing time is inevitably very long.

On the other hand, where the layout data 804 of the plane model 803 is used (i.e., where the arrangement of the product packages is predetermined), the matching unit 124 does not have to slightly move the template for each scan. When the template is rotated, the angles of rotation are limited to the angles at which predetermined arrangement is detected. Accordingly, the processing time can be significantly shortened.

Likewise, when the local image feature matching is performed, the matching unit 124 is only required to perform matching for a region of predetermined arrangement. This enables accurate matching.

Figure 9:
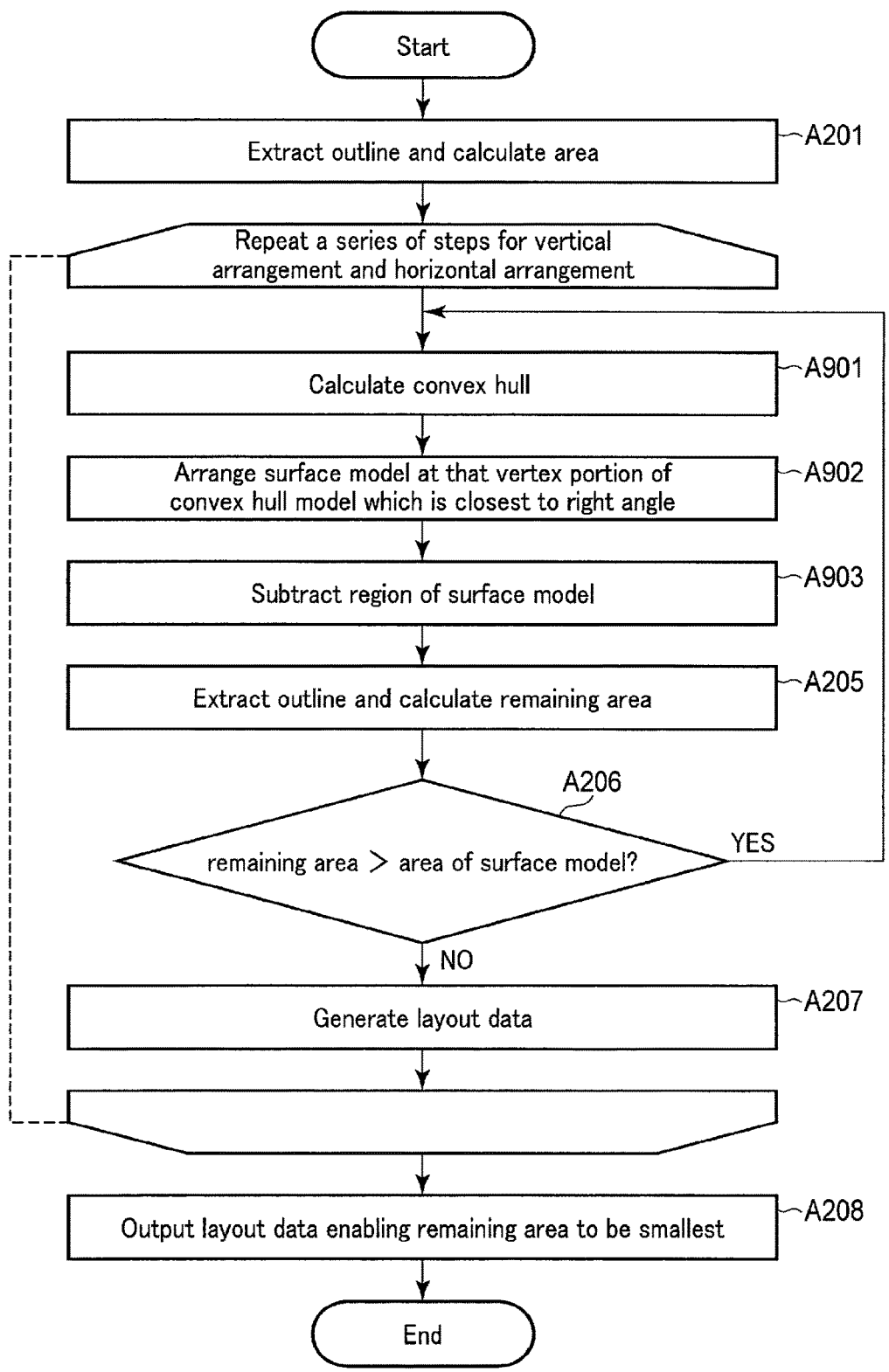
FIG. 9 is a flowchart illustrating the layout data generation processing depicted in FIG. 2A.

The arrangement detection apparatus 100 may perform layout data generation processing in the manner shown in FIG. 9. For example, the arrangement detection apparatus 100 can detect a series of operations for product packages even if the product packages include an obliquely arranged one, as shown in FIG. 10. FIG. 10 shows an object including an obliquely-arranged product package 1001 and three adjacent product packages 1002, which are arranged in the same plane. The arrangement detection apparatus 100 measures the object shown in FIG. 10 and obtains the plane model 1101 shown in FIG. 11A. The arrangement detection apparatus 100 generates layout data 1102, such as that shown in FIG. 11B, for the outline of the plane model 1101, and outputs position information based on the outlines 1201 and normal line 1202 shown in FIG. 12. An explanation of similar steps to those mentioned above will be omitted.

The layout data generator 123 executes a series of steps A901 to A903 and A205 to A207 for vertical arrangement in which surface models are arranged in a portrait style and horizontal arrangement in which surface models are arranged in a landscape style.

In step A901, the layout data generator 123 calculates a convex hull of the plane model. Then, the layout data generator 123 extracts a convex hull model representing the outline of the convex hull.

In step A902, the layout data generator 123 arranges a surface model at that vertex portion of the convex hull model which is closest to the right angle. To be specific, the layout data generator 123 places a vertex of the surface model in accordance with the angle of the vertex of the convex hull model which is closest to the right angle. Then, the layout data generator 123 may arrange the surface model in such a manner that the longer side and shorter side of the surface model are on the line segments where the linear portions of the plane model and the linear portions of the convex hull model overlap.

In step A903, the layout data generator 123 subtracts the region of the surface model from the region of the plane model if the placed surface model is entirely included in the region of the plane model. Then, the layout data generator 123 stores data on the center of gravity and vertex coordinates of the surface model in a memory (not shown).

FIGS. 13A-13J illustrate a specific example of the layout data generation processing shown in FIG. 9. In the following, a specific example of the layout data generation processing will be described, referring to the flowchart of FIG. 9 and using the plane model 1101 shown in FIG. 11A and surface model 502 shown in FIG. 5.

Figure 13A:
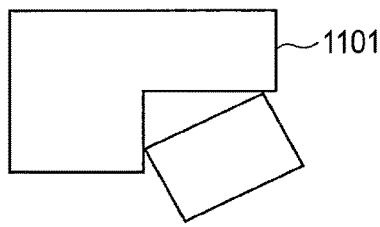
FIGS. 13A-13J illustrate an example of a method in which surface models are laid on a plane model.
Figure 13B:
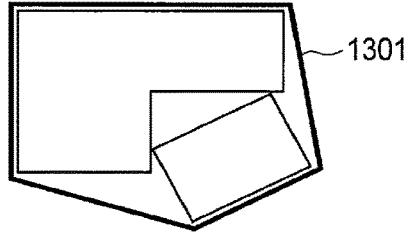

The layout data generator 123 extracts an outline of a planar region (plane model 1101) (step A201, FIG. 13A), calculates a convex hull of the plane model 1101, and extracts a convex hull model 1301 representing the outline of the convex hull (Step A901, FIG. 13B).

Figure 13C:
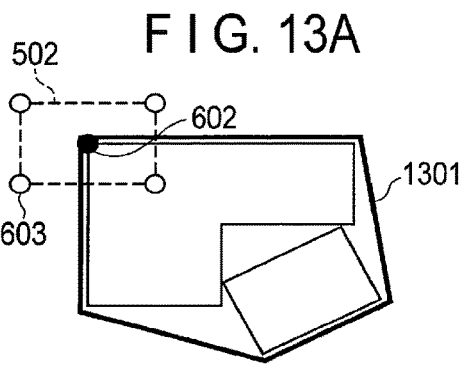
Figure 13D:
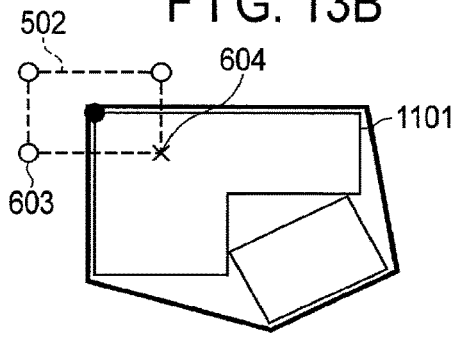
Figure 13E:
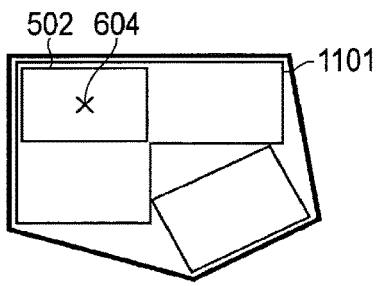

Subsequently, the layout data generator 123 arranges a surface model 502 at that vertex portion of the convex hull model 1301 which is closest to the right angle (step A902). To be specific, the layout data generator 123 determines vertexes 603 of the surface model 502, with a vertex 602 of the convex hull model 1301 closest to the right angle as a center, as shown in FIG. 13C. In FIG. 13D, the layout data generator 123 extracts a vertex located inside the plane model 1101 from the vertexes 603 of the surface model 502. In FIG. 13E, the layout data generator 123 arranges the surface model 502 in the plane model 1101, with the extracted vertex 604 as a center. If another extracted vertex is located near the extracted vertex, the layout data generator 123 may merge the vertexes.

The layout data generator 123 subtracts the region of the surface model 502 from the region of the plane model 1101 since the region of the surface model 502 is entirely included in the region of the plane model 1101 (step A903). Then, the layout data generator 123 stores data on the center of gravity and vertex coordinates of the surface model 502 in a memory (not shown).

Figure 13F:
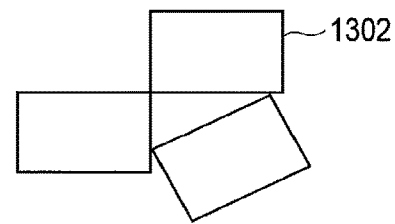
Figure 13G:
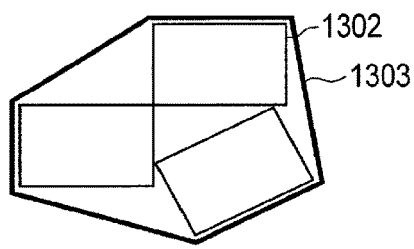

The layout data generator 123 extracts an outline of the plane model (plane model 1302) from the surface model 502 is subtracted, and calculates an area (a remaining area) of the region defined by the outline of the plane model 1302 (step A205, FIG. 13F). The layout data generator 123 determines that the remaining area is larger than the area of the surface model 502 (step A206), calculates a convex hull of the plane model 1302, and extracts a convex hull model 1303 representing the outline of the convex hull (Step A901, FIG. 13G).

Figure 13H:
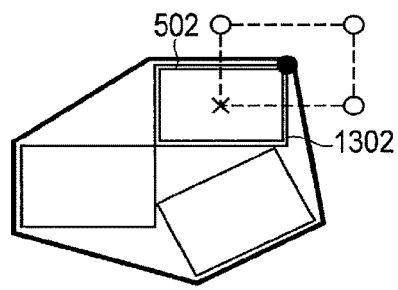
Figure 13I:
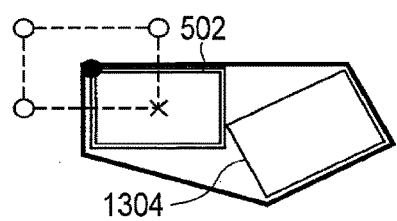

Thereafter, the layout data generator 123 repeats a series of operations, as shown in FIG. 13H and FIG. 13I, so as to subtract the region of the surface model 502 from the regions of plane model 1302 and plane model 1304.

Figure 13J:
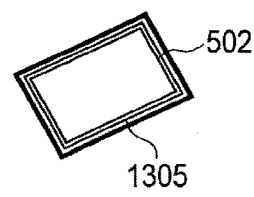

In FIG. 13J, the layout data generator 123 detects that the remaining plane model 1305 is identical to the surface model 502 and determines that the remaining area is zero (step A205). The layout data generator 123 determines that the remaining area is not larger than the area of the surface model 502 (step A206) and generates layout data representing how surface models 502 are arranged in the plane model 1101 (step A207).

As described above, the arrangement detection apparatus according to the first embodiment can detect a product package located closest to an observation point, based on the distance information measured from the observation point. Even if the boundary between arranged objects is hard to perceive, the arrangement detection apparatus can detect how the individual products are arranged, based on the size of each product package. In addition, even if product packages are partly oblique, the arrangement detection apparatus can detect how each product package is arranged. Therefore, the arrangement detection apparatus can detect how the individual objects are arranged, even if the arranged objects are partly displaced.

(Second Embodiment)

As shown in FIG. 14, the pickup apparatus 1400 of the second embodiment comprises an arrangement detection apparatus 1410 and an acquirer 1420. The acquirer 1420 includes a linear-movement actuator 1421, a rotation actuator 1422, and a vacuum suction plate 1423. The arrangement detection apparatus 1410 may have the same configuration or a similar configuration to that of arrangement detection apparatus 100 described above. A description will be given, referring to the example shown in FIG. 15.

The arrangement detection apparatus 1410 detects an object placed at the origin of the Z axis and detects a planar region of the object. Also, the arrangement detection apparatus 1410 generates layout data on the planar region and calculates position information on a rectangular parallelepiped included in the planar region. The arrangement detection apparatus 1410 outputs the position information to the acquirer 1420. The arrangement detection apparatus 1410 is provided on the linear-movement actuator portion 1421a, but may be provided at any other position desired as long as it can detect an object.

The acquirer 1420 receives position information from the arrangement detection apparatus 1410. Based on the position information received, the acquirer 1420 picks up a product package included in the planar region. Although one end of the linear-movement actuator portion 1421a (mentioned below) of the acquirer 1420 is shown as being fixed to an apparatus securing portion 1501, this structure is not restrictive.

The linear-movement actuator 1421 includes a linear-movement actuator portion 1421a movable in the X-axis direction, a linear-movement actuator portion 1421b movable in the Y-axis direction, and a linear-movement actuator portion 1421c movable in the Z-axis direction. Linear-movement actuator portion 1421c has one end connected to the rotation actuator 1422. Based on the position information, the linear-movement actuator 1421 drives its portions in such manner that the distal end of linear-movement actuator portion 1421c is located at the same position as the center of gravity of a product to be picked up.

The rotation actuator 1422 includes a rotation actuator portion 1422a rotatable around the Z-axis and a rotation actuator portion 1422b rotatable around a central axis perpendicular to the Z-axis. Rotation actuator portion 1422a is connected to linear-movement actuator portion 1421c at one end and connected to rotation actuator portion 1422b at the other end. Rotation actuator portion 1422b is arranged between the rotation actuator portion 1422a and the vacuum suction plate 1423.

Rotation actuator portion 1422a is rotated in such a manner that the longer sides of the vacuum suction plate 1423 extend in the same direction as the longer sides of a product package to be picked up. Rotation actuator portion 1422b is rotated in such a manner that the face of the vacuum suction plate 1423 become parallel to the face of the product package to be picked up.

Rotation actuator portion 1422b is connected to one surface of the vacuum suction plate 1423, and a suction pad for sucking a product package is provided on the other surface of the vacuum suction plate 1423. Driven by the actuators, the vacuum suction plate 1423 moves close to a position where a product package to be picked up is located and picks up the product package.

The acquirer 1420 may employ a multi-joint robot arm in place of the linear-movement actuator 1421, or may employ a robot hand for clamping an object in place of the vacuum suction plate 1423. That is, the acquirer 1420 may be any type as long as it can pick up a product package.

FIGS. 16A-16D show an example of an operation of the pickup apparatus 1400. It should be noted that the pickup apparatus 1400 is applicable to product packages having no design thereon. In FIGS. 16A-16D, illustration of part of the arrangement detection apparatus 1410 and part of the acquirer 1420 are omitted for simplicity.

Figure 16A:
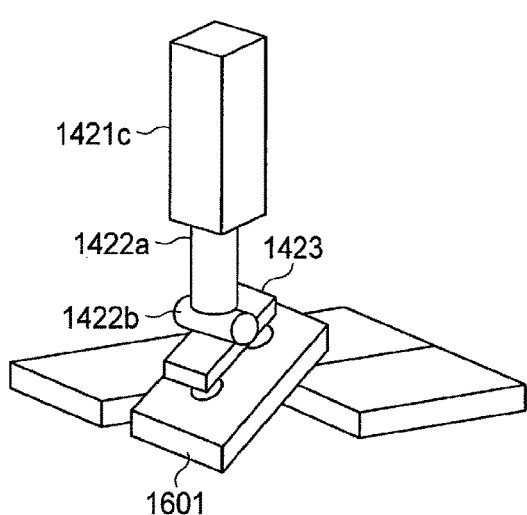
FIGS. 16A-16D illustrate an example of an operation performed by the pickup apparatus depicted in FIG. 15.
Figure 16B:
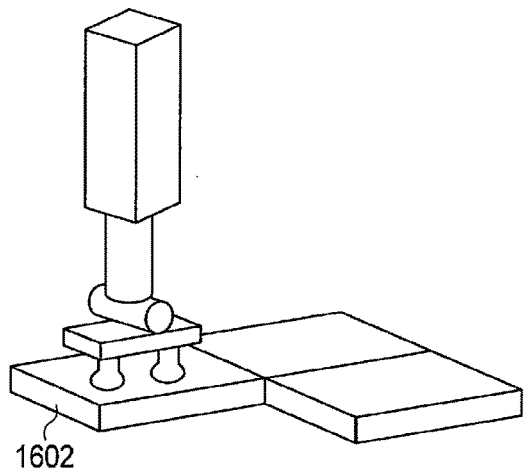
Figure 16C:
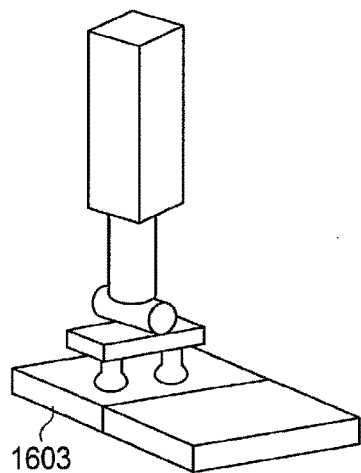
Figure 16D:
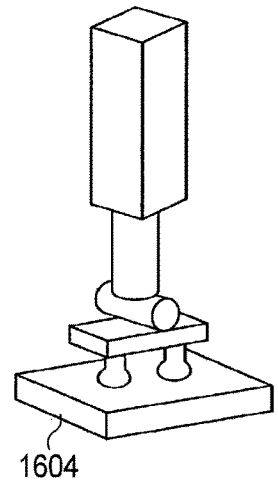

First of all, the pickup apparatus 1400 picks up a product package 1601 located at the highest position (i.e., the position nearest to the measurement point) (FIG. 16A). Then, the pickup apparatus 1400 picks up product packages 1602 to 1604, based on the position information on the planar region (FIGS. 16B-16D). The pickup apparatus 1400 may be configured to pick up product packages in any desirable order.

As described above, the pickup apparatus of the second embodiment comprises the arrangement detection apparatus of the first embodiment. Therefore, the pickup apparatus can detect how the individual objects are arranged even if part of the arranged objects are displaced, and can pick up the objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An arrangement detection method will be additionally described.

(1) An arrangement detection method comprising:

measuring surfaces of polyhedrons from a first any point, the polyhedrons being identical in shape and arranged in contact with each other;

extracting data on the surfaces measured by the measuring unit, and also extracting a surface region containing a portion closest to the first any point and having a maximal area;

calculating a center of gravity and a normal line of the surface region;

generating first data representing outlines which are included in the surface region viewed from a point on the normal line extending from the center of gravity and which are those of a desired surface of at least one of the polyhedrons; and calculating position information on the polyhedrons included in the surface region and having the shape, utilizing the positions of the outlines of the desired surface of the polyhedrons, the positions being represented by the first data.

(2) The method according to (1), wherein
the measuring comprises obtaining a set of coordinates of any points on an identical surface to that of the first any point, as second data.

(3) The method according to (1) or (2), wherein
the generating comprises generating first data representing the outline of the desired surface the polyhedrons, the first data being obtained when surface models, which represent the outlines of desired surfaces of the polyhedrons, are laid on a plane model, which represents the outline of the surface region, and when an area of the plane model not overlaid with the surface models is minimal.

(4) The method according to (3), wherein
the generating comprises generating the first data by: placing a surface model on the plane model, with vertex angles in conformity with each other; and subtracting the region of the surface model from the region of the plane model if the placed surface model is entirely included in the plane model.

(5) The method according to (3), wherein
the generating comprises generating the first data by: calculating a minimal circumscribed quadrangle of the plane model; extracting a quadrangle model representing an outline of the minimal circumscribed quadrangle; placing a surface model on the plane model, with vertex angles in conformity with each other; and subtracting the region of the surface model from the region of the plane model if the placed surface model is entirely included in the plane model.

(6) The method according to (4) or (5), wherein
the generating comprises generating the first data by: arranging another surface model in the region containing a side of the plane model if the region of the placed surface model is entirely included in a region containing two vertexes sharing the side of the plane model; and subtracting the region of the surface model from the region containing the side.

(7) The method according to (3), wherein
the generating comprises generating the first data by: calculating a convex hull of the plane model; extracting a convex hull model representing an outline of the convex hull; placing a surface model at that vertex portion of the convex hull model which is closest to the right angle; and subtracting the region of the surface model from the region of the plane model if the placed surface model is entirely included in the plane model.

(8) The method according to any of (1) to (7), further comprising:
performing template matching for a surface region corresponding to the layout data, using a template representing a design on the desired surface.

(9) The method according to any of (1) to (7), further comprising:
performing local image feature matching for the surface region corresponding to the first data, using a local image feature which is extracted, with part of a design on the desired surface being processed as a vector.

(10) The method according to any of (1) to (9), further comprising:
selecting one of two or more surface regions where the two or more surface regions are extracted.

What is claimed is:
1. An imaging apparatus for automated detection of objects in a stack, each object having an identical polyhedron shape, the apparatus comprising:
a distance image sensor configured to acquire an image representing surfaces of objects, each of the objects being a predefined polyhedron, wherein the objects are identical in shape and arranged in contact with each other; and
processing circuitry configured to
determine, using the acquired image, a surface region from the surfaces of the objects, the surface region corresponding to those of the surfaces that lie in a first plane and having a maximal area relative other surface regions corresponding to those of the surfaces that lie in respective planes other than the first plane,
generate, using a shape of a side of the predefined polyhedron corresponding to the surfaces in the surface region, outlines of the surfaces of the objects included in the surface region, and
calculate position information of the objects in the surface region, using the outlines.

2. The apparatus according to claim 1, wherein the processing circuitry is further configured to
calculate the position information of the objects in the surface region by calculating a center of gravity and a normal line of the surface region, and
generate the outlines using the surface region when viewed from a point on the normal line extending from the center of gravity.

3. The apparatus according to claim 1, wherein the image acquired by the distance image sensor includes three-dimensional data representing coordinates of points on the surfaces of the objects.

4. The apparatus according to claim 1, wherein the processing circuitry is further configured to generate the outlines by minimizing an area of a plane model that is not overlaid with surface models, when the surface models are laid on the plane model, the surface models representing respective areas of the outlines, and the plane model representing an area of the surface region.

5. The apparatus according to claim 4, wherein the processing circuitry is further configured to generate the outline generator generates by placing a vertex of one of the surface models at a vertex of the plane model and subtracting from the plane model an area overlaid by the one of the surface models, if the one of the surface models is entirely in the plane model.

6. The apparatus according to claim 5, wherein the processing circuitry is further configured to generate the outline by,
when the one of the surface models is placed along an edge of the plane model, arranging another of the surface models in the plane model along the edge and next to the one of the surface models, and
subtracting from the plane model an area overlaid by the another of the surface models, if the another of the surface models is entirely in the plane model.

7. The apparatus according to claim 4, wherein the processing circuitry is further configured to generate the outline by:
calculating a minimal circumscribed quadrangle of the plane mode,
extracting a quadrangle model representing an outline of the minimal circumscribed quadrangle,
placing a vertex of one of the surface models at a vertex of the plane model, and
subtracting from other region of the plane model an area overlaid by the one of the surface models, if the one of the surface models is entirely in the plane model.

8. The apparatus according to claim 4, wherein the processing circuitry is further configured to generate the outline by:
    calculating a convex hull of the plane model;
    extracting a convex hull model representing an outline of the convex hull;
    placing a surface model at that vertex portion of the convex hull model which is closest to the right angle; and
    subtracting one region of the surface model from other region of the plane model if the placed surface model is entirely included in the plane model.

9. The apparatus according to claim 1, wherein the processing circuitry is further configured to
    perform template matching for the surface region, using a template representing the shape of the side of the predefined polyhedron.

10. The apparatus according to claim 1, wherein the processing circuitry is further configured to
    perform local image feature matching for the surface region, using a local image feature, which is extracted, with part of the shape of the side of the predefined polyhedron being processed as a vector.

11. The apparatus according to claim 1, wherein the processing circuitry is further configured to determine the surface region by selecting the surface region from two or more surface regions that are extracted from the acquired image.

12. A object moving apparatus comprising:
    the imaging apparatus of claim 1; and
    an actuator connected to a holding member, the holding member being configured to pick up and hold one or more of the objects, and the actuator being configured to move, using the position information, the holding member to a position of one of the objects included in the surface region and, when the holding member picks up and holds the one of the objects, move the one of the objects to another position.

13. The apparatus according to claim 1, wherein the objects are packages of a product, and the predefined polyhedron is a rectangular parallelepiped or a cuboid.

* * * * *